United States Patent
Dixon et al.

(10) Patent No.: US 8,573,097 B2
(45) Date of Patent: Nov. 5, 2013

(54) SYSTEM AND METHOD FOR AUTOMATIC LOCAL RETURN FOR LATHE NC-MACHINING CYCLE INTERRUPTION

(75) Inventors: Scott Dixon, Rexburg, ID (US); Reinhard Rinas, Cologne (DE); Oliver Brugge, Cologne (DE); Olaf Kaltz, Cologne (DE)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1983 days.

(21) Appl. No.: 11/610,273

(22) Filed: Dec. 13, 2006

(65) Prior Publication Data

US 2007/0199414 A1    Aug. 30, 2007

Related U.S. Application Data

(60) Provisional application No. 60/750,188, filed on Dec. 14, 2005.

(51) Int. Cl.
*G05B 19/4065* (2006.01)

(52) U.S. Cl.
USPC .............. 82/1.11; 82/118; 700/174; 700/177

(58) Field of Classification Search
USPC ........... 82/1.11, 118; 700/159, 180, 192, 174, 700/177–178
See application file for complete search history.

(56) References Cited

U.S. PATENT DOCUMENTS

| | | | | |
|---|---|---|---|---|
| 3,548,172 A | * | 12/1970 | Idelsohn et al. | 318/561 |
| 4,045,660 A | * | 8/1977 | Weisgerber et al. | 700/192 |
| 4,055,787 A | * | 10/1977 | Beadle et al. | 318/591 |
| 4,107,785 A | * | 8/1978 | Seipp | 712/223 |
| 4,442,493 A | * | 4/1984 | Wakai et al. | 700/177 |
| 4,442,494 A | * | 4/1984 | Fromson et al. | 702/34 |
| 4,446,525 A | * | 5/1984 | Hoch et al. | 700/181 |
| 4,471,444 A | * | 9/1984 | Yee et al. | 700/175 |
| 4,509,126 A | * | 4/1985 | Olig et al. | 700/173 |
| 4,513,380 A | * | 4/1985 | Spooner | 700/177 |
| 4,519,040 A | * | 5/1985 | Brankamp et al. | 700/177 |
| 4,547,847 A | * | 10/1985 | Olig et al. | 700/52 |
| 4,597,040 A | * | 6/1986 | Buizer | 700/190 |
| 4,604,560 A | * | 8/1986 | Inagaki et al. | 318/567 |
| 4,636,779 A | * | 1/1987 | Thomas et al. | 340/680 |
| 4,636,780 A | * | 1/1987 | Thomas et al. | 340/680 |
| 4,723,219 A | * | 2/1988 | Beyer et al. | 700/190 |
| 4,724,524 A | * | 2/1988 | Thomas et al. | 700/175 |
| 4,849,741 A | * | 7/1989 | Thomas | 340/683 |
| 4,918,616 A | * | 4/1990 | Yoshimura et al. | 702/39 |
| 4,967,365 A | * | 10/1990 | Hampl et al. | 700/173 |
| 5,060,544 A | * | 10/1991 | Hanaki et al. | 82/1.11 |
| 5,212,645 A | * | 5/1993 | Wildes et al. | 700/108 |
| 5,243,533 A | * | 9/1993 | Takagi et al. | 700/175 |
| 5,298,889 A | * | 3/1994 | Diei et al. | 340/680 |

(Continued)

FOREIGN PATENT DOCUMENTS

| | | |
|---|---|---|
| EP | 1569262 A | 8/2005 |
| GB | 2 176 911 A | 1/1987 |
| KR | 2006075304 A * | 7/2006 |

*Primary Examiner* — Andrea Wellington
*Assistant Examiner* — Sara Addisu

(57) ABSTRACT

A system, method, and computer program for monitoring a machine cycle. A method includes the steps of tracking an elapsed cumulative measure; comparing the elapsed cumulative measure with a cycle interrupt interval; interrupting a machining cycle at the cycle interrupt interval; and performing a local return to a defined position.

21 Claims, 4 Drawing Sheets

(56) References Cited

U.S. PATENT DOCUMENTS

| | | | |
|---|---|---|---|
| 5,579,232 A * | 11/1996 | Tong et al. | 700/175 |
| 5,904,457 A * | 5/1999 | Suwijn et al. | 409/1 |
| 6,732,056 B2 * | 5/2004 | Kluft et al. | 702/39 |
| 6,937,942 B2 * | 8/2005 | Lee | 702/34 |
| 7,571,022 B2 * | 8/2009 | Jalluri et al. | 700/160 |
| 2005/0273190 A1 * | 12/2005 | Duffin et al. | 700/112 |

* cited by examiner

SYSTEM AND METHOD FOR AUTOMATIC LOCAL RETURN FOR LATHE NC-MACHINING CYCLE INTERRUPTION

PRIORITY APPLICATION

The present application claims priority of U.S. Provisional Application, Ser. No. 60/750,188 filed Dec. 14, 2005, which is incorporated herein by reference.

TECHNICAL FIELD

The presently preferred embodiment of the innovations described herein relate generally to computer aided machining. More specifically, the presently preferred embodiment relates to automatic local return for lathe cycle interruption.

BACKGROUND

The computer has greatly affected essentially all forms of information management, including the graphical editing and computer aided design and drafting (CAD) tools. Some simpler geometric modeling computer program products are two dimensional, providing only length and width dimensions of objects, while more complex and powerful computer program products provide three dimensional editing and visualization.

Today, computer aided manufacturing (CAM) applications work integral with CAD applications to ease the design and production of machined parts. To mill parts, numerically controlled (NC), or computer numerically controlled (CNC) machines cut away material from a block of matter in various stages, commonly referred to as rough finishing and fine finishing.

In turning manufacturing, it is essential to control the material removal process in order to attain the desired surface quality, but also to protect the investment in manufacturing tooling. The duty for investment protection implies that the manufacturing engineer is given the CAM system functionality to plan his manufacturing processes accordingly. Usually, the manufacturing process consists of complex machining cycles that comprise a multitude of individual NC-commands for material removal. Consisting of repeated roughing or finish passes at incremental cut depth, these machine cycles, also known as "operations", require control for the duration of the process where the tool is removing material versus tool life as the critical factor.

In is essential to have the ability to interrupt a machining cycle for a variety of reasons. For example, in areas of turning where extremely hard materials have to be machined (e.g., turbine manufacturing). In another example, the cutting tool may be completely worn out requiring replacement after a certain amount of cutting time has elapsed, while the machining cycle has not yet been finished. And in another example, the user may want to inspect the interim result of a complex operation and interrupt the machine cycle to do so.

Interrupting a cutting cycle manually, by editing the NC-file or the internal tool path as represented in a CAM system requires repetitive and cumbersome work that most often requires a complete rework if changes in the design model or previous manufacturing operations have occurred. Also, approaches supporting a so-called "manual" local return after a user-definable number of roughing or finishing passes, in general, do not provide a satisfactory solution, as cutting passes and time intervals for cycle interruption tend to diverge.

What is needed is a system and method for automatic local return for lathe no-machining cycle interruption.

SUMMARY

To achieve the foregoing, and in accordance with the purpose of the presently preferred embodiment as broadly described herein, the present application provides a method of monitoring a machine cycle, comprising the steps of tracking an elapsed cumulative measure; comparing said elapsed cumulative measure with a cycle interrupt interval; interrupting a machining cycle at said cycle interrupt interval; and performing a local return to a defined position upon said interrupting step. The method, wherein said elapsed cumulative measure is a machine time. The method, wherein said elapsed cumulative measure is cutting distance. The method, wherein said cycle interrupt interval is an automatic local return interval. The method, wherein said cycle interrupt interval is one of an action and an occurrence. The method, wherein said performing step occurs at an automatic local return time. The method, wherein said performing step occurs at an automatic local return distance. The method, wherein said defined position is one of a user defined position and an automatically defined position. The method, further comprising the step of updating and adjusting said cycle interrupt interval. The method, further comprising the step of updating said elapsed cumulative measure. The method, further comprising the step of analyzing a plurality of processor generated motions.

Another advantage of the presently preferred embodiment is to provide a computer-program product tangibly embodied in a machine readable medium to perform method of monitoring a machine cycle, comprising instructions for tracking an elapsed cumulative measure; instructions for comparing said elapsed cumulative measure with a cycle interrupt interval; instructions for interrupting a machining cycle at said cycle interrupt interval; and instructions for performing a local return to a defined position upon said interrupting step. The computer-program product, wherein said elapsed cumulative measure is a machine time. The computer-program product, wherein said elapsed cumulative measure is cutting distance. The computer-program product, wherein said cycle interrupt interval is an automatic local return interval. The computer-program product, wherein said cycle interrupt interval is one of an action and an occurrence. The computer-program product, wherein said performing instructions occur at an automatic local return time. The computer-program product, wherein said performing instructions occur at an automatic local return distance. The computer-program product, wherein said defined position is one of a user defined position and an automatically defined position. The computer-program product, further comprising the instructions of updating and adjusting said cycle interrupt interval. The computer-program product, further comprising the instructions of updating said elapsed cumulative measure. The computer-program product, further comprising the instructions of analyzing a plurality of processor generated motions.

And another advantage of the presently preferred embodiment is to provide a data processing system having at least a processor and accessible memory to implement a method of monitoring a machine cycle, comprising means for tracking an elapsed cumulative measure; means for comparing said elapsed cumulative measure with a cycle interrupt interval; means for interrupting a machining cycle at said cycle interrupt interval; and means for performing a local return to a defined position upon said interrupting step.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 4:
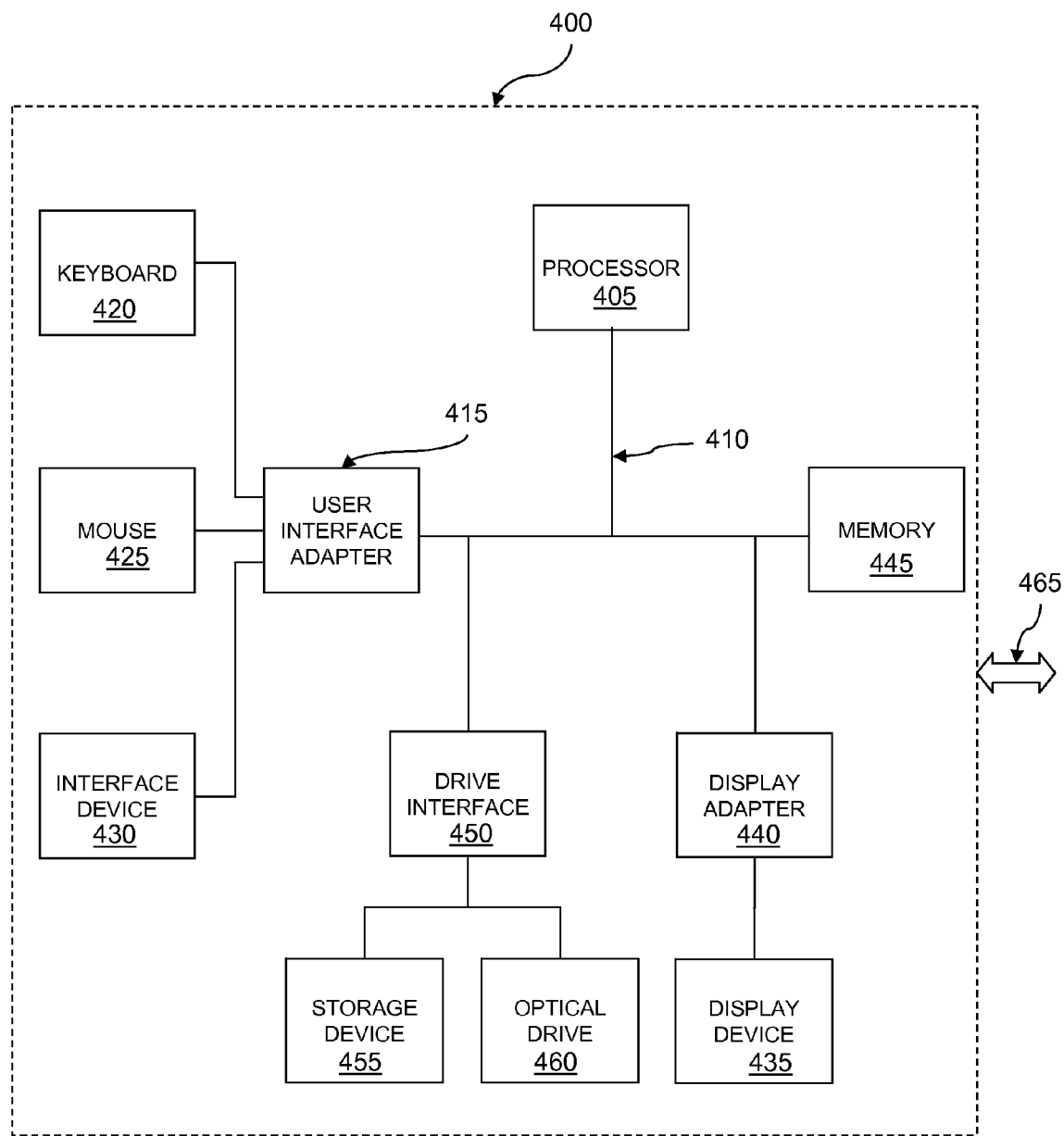
FIG. 4 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for automatic local return for lathe NC-machining cycle interruption. Now therefore, in accordance with the presently preferred embodiment, an operating system executes on a computer, such as a general-purpose personal computer. FIG. 4 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 4, an exemplary system for implementing the presently preferred embodiment includes a general-purpose computing device in the form of a computer 400, such as a desktop or laptop computer, including a plurality of related peripheral devices (not depicted). The computer 400 includes a microprocessor 405 and a bus 410 employed to connect and enable communication between the microprocessor 405 and a plurality of components of the computer 400 in accordance with known techniques. The bus 410 may be any of several types of bus structures including a memory bus or memory controller, a peripheral bus, and a local bus using any of a variety of bus architectures. The computer 400 typically includes a user interface adapter 415, which connects the microprocessor 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the microprocessor 405 via a display adapter 440. The bus 410 also connects the microprocessor 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 445 of the computer 400. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
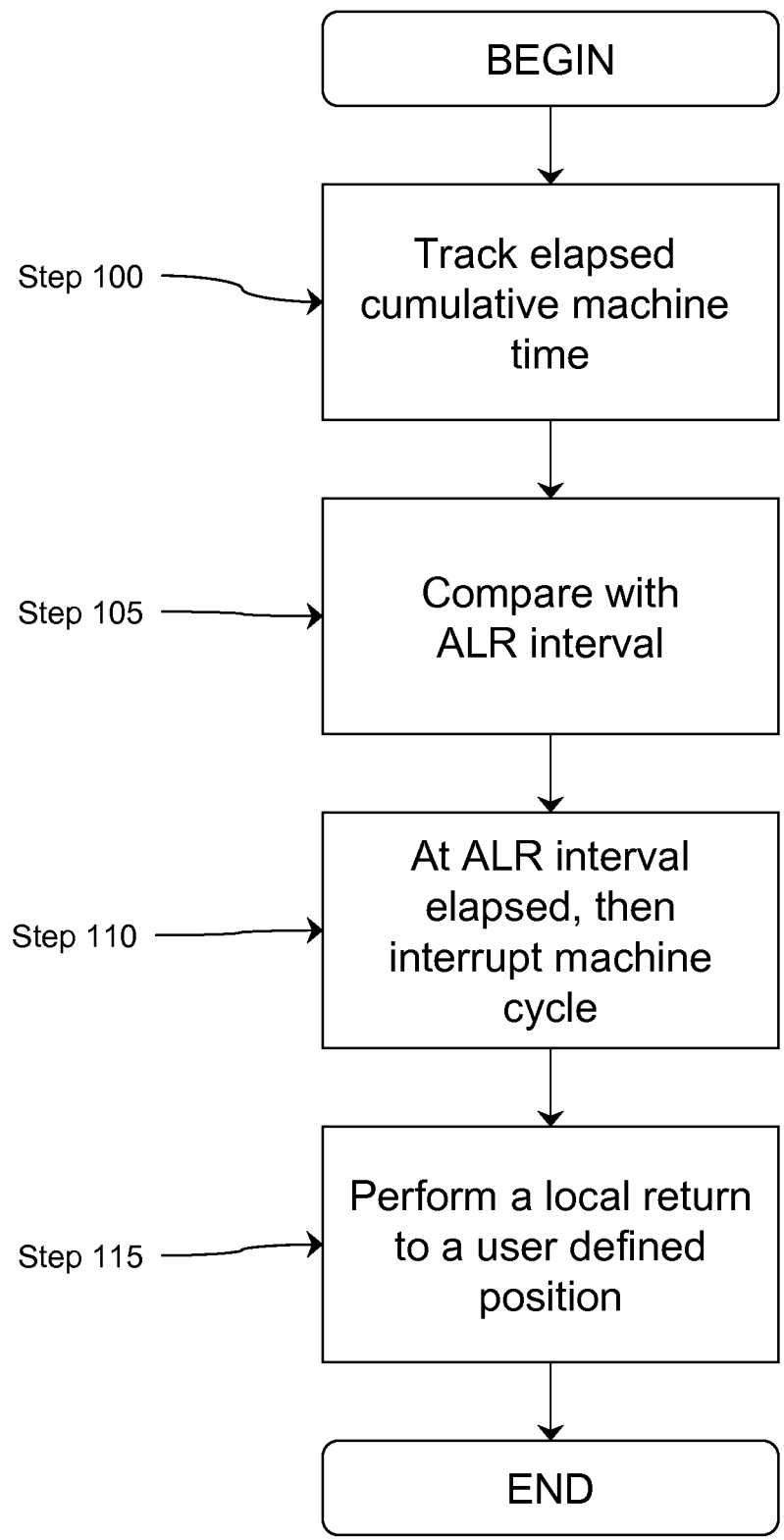
FIG. 1 is a data flow diagram of the method employed by the presently preferred embodiment.

FIG. 1 is a data flow diagram of the method employed by the presently preferred embodiment. Referring to FIG. 1, the presently preferred embodiment discloses a cycle monitoring capability that tracks an elapsed cumulative machine time (Step 100) to compare with a cycle interrupt interval, also referred to as an automatic local return (ALR) interval (Step 105). The cycle monitoring capability interacts with a machining cycle to interrupt the machine cycle whenever the ALR interval has elapsed (Step 110). The moment of time when interrupt occurs is referred to as ALR time. It is at the ALR time when the cycle monitoring capability performs a local return to a user-defined position (Step 115), carrying out a traversal move and/or a local return event as specified by a user and re-engages to continue the cycle.

Figure 2:
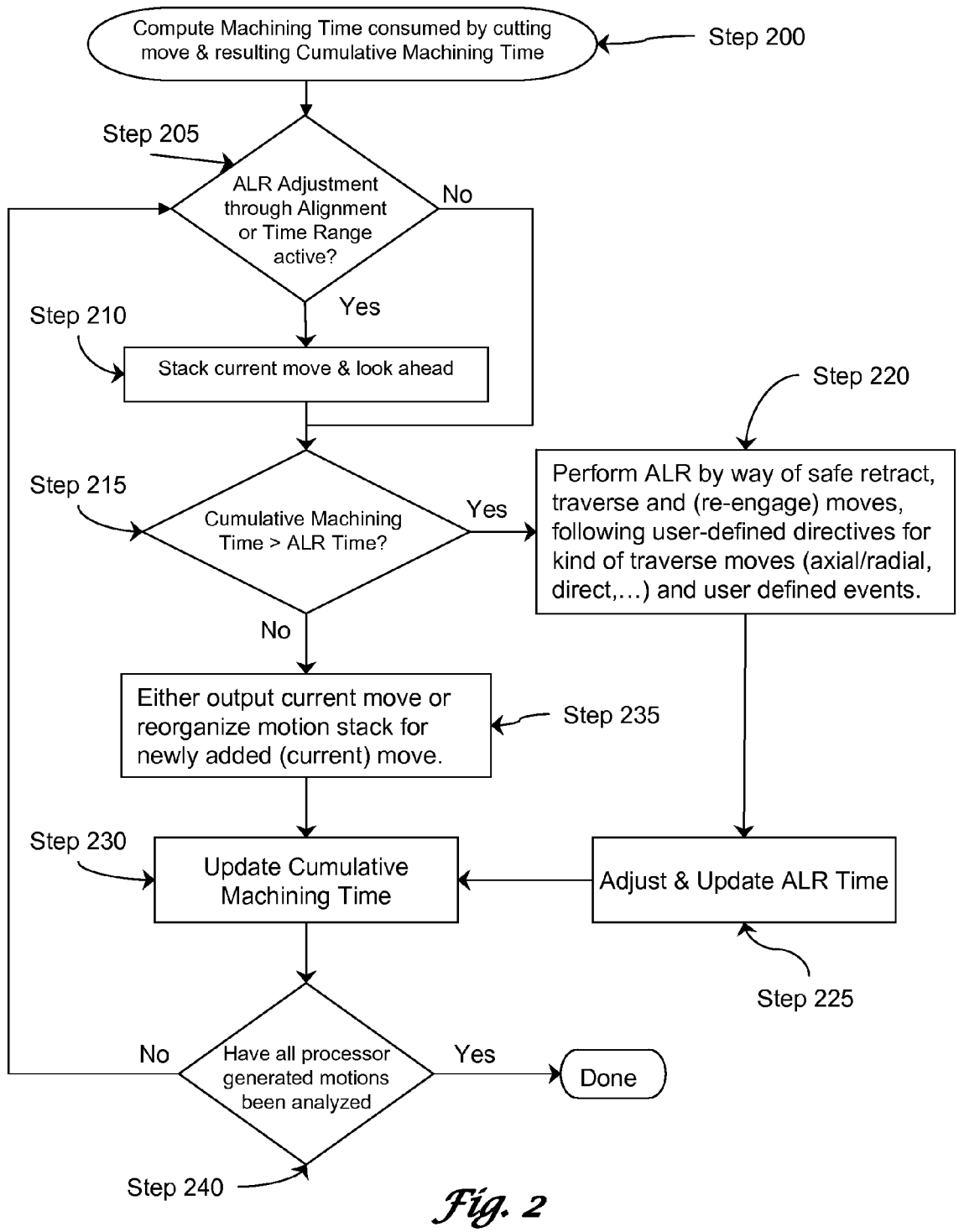
FIG. 2 is a logic flow diagram for a series of steps for a automatic local return by a time measurement.

FIG. 2 is a logic flow diagram for a series of steps for a automatic local return by a time measurement. Referring to FIG. 2, begin computing the machining time consumed by a cutting move and a resulting cumulative machining time (Step 200). If ALR adjustment is active through either alignment or an active non-trivial time range (Step 205), then the current move is stacked, and a look-ahead action is applied (Step 210). Regardless, if the cumulative machining time is greater than the ALR time, considering a potential non-trivial time range/alignment that allows to re-time the ALR for ALR adjustment (Step 215), then perform an automatic local return by way of a safe retract traverse and re-engage moves, following user-defined directives for the types of traverse moves and other user defined events (Step 220). Traverse moves can be axial, radial, direct, etc., and user defined events can be NC-commands like dwell, coolant-on, or stop, for example. Update and adjust the ALR time (Step 225), and then update the cumulative machining time (Step 230). If, however, the cumulative machining time is less than the ALR time (considering time range/alignment) (Step 215), either output the current move or re-organize a motion stack for the newly added (or current) move (Step 235). The motion stack management facilitates the look-ahead operation as a prerequisite for ALR adjustment. Update the cumulative machining time (Step 230). Following the cumulative machining time update, if all processor generated motions have been analyzed (Step 240), then finish. Otherwise, continue with the next cutting motion generated in the lathe-machine cycle, again querying whether the ALR adjustment occurs through either alignment or an active time range (Step 205).

Figure 3:
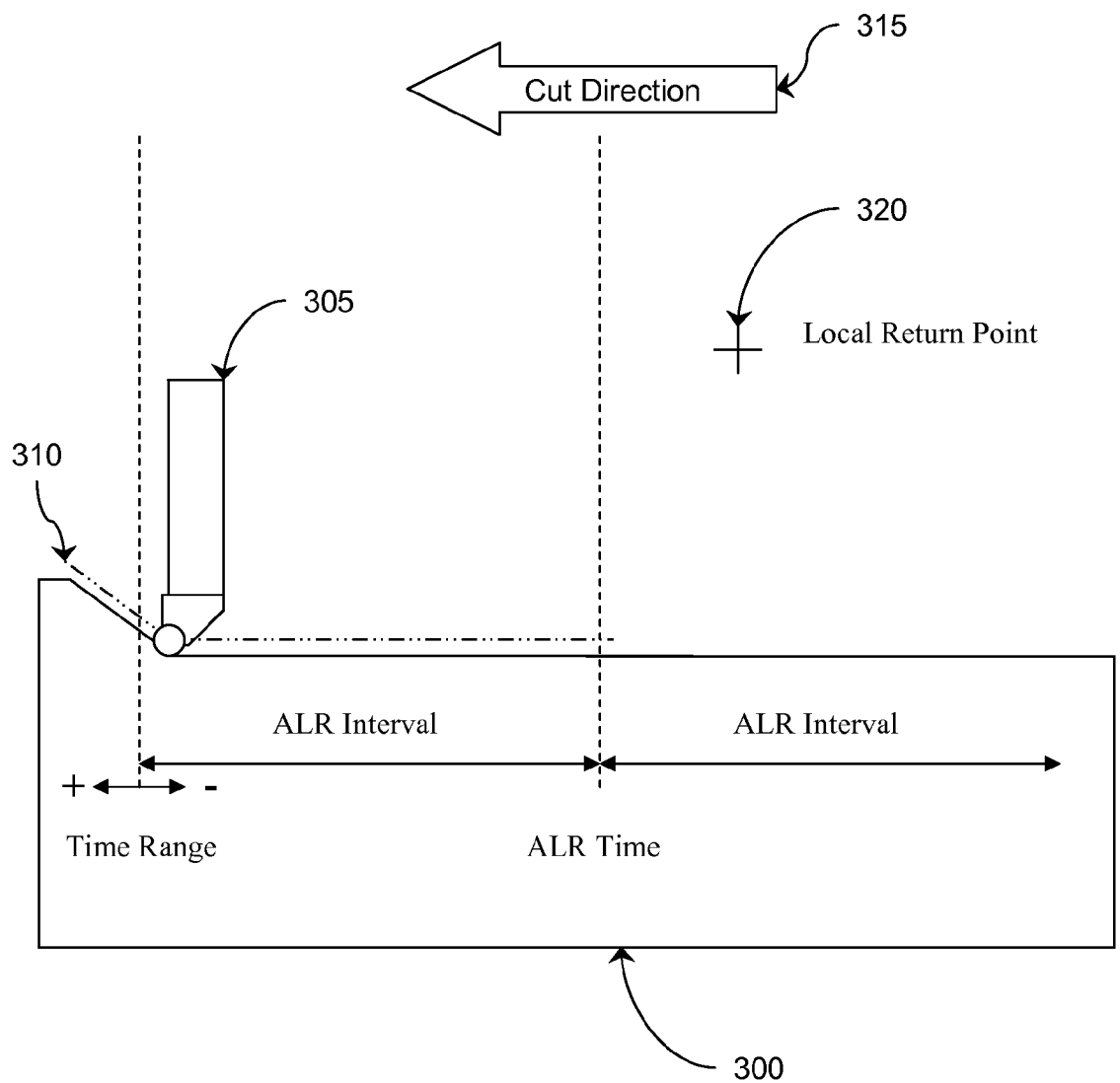
FIG. 3 is an illustration of a smart adjustment for with a non-trivial time range for the specified ALR time.

FIG. 3 is an illustration of a smart adjustment for with a non-trivial time range for the specified ALR time. Referring to FIG. 3, an in-process workpiece 300 in the CNC-lathe machine with a cutting tool 305 following a cut path 310 along a cutting direction 315. Because the ALR time is defined by the user, it can happen at potentially any interval. That being said, it is sometimes desirable perform a smart adjustment to shift the ALR time to a more suitable moment. Examples of more suitable moments include, but are not limited to, to prevent the cutting tool 305 from moving to a local return point 320 when close to completing a rough-cut/finish pass; or, should the user want to prevent the cutting tool 305 from starting a clean-up operation during the rough-cut pass before triggering the local return. The smart adjustment, or ALR adjustment range, lets the user specify a time range in which the CNC lathe is allowed to continue beyond, or stop before, the elapsed machining time limit for the local return. The ALR adjustment range allows the cutting tool 305 the ability then complete the active roughing pass or clean-up operation. The ALR adjustment range has an upper and a lower range limit.

Application

In practice, a machining time counter keeps track of the elapsed time or the cumulative tool travel of the cutting motions. As soon as the machining time counter passes the initially computed ALR Time minus a lower range limit, the system disclosed herein aligns the moment to trigger the ALR with the end of the rough-cut pass, the start or the end of the clean-up pass or a plunge cut as long as the initial ALR time plus an upper range limit has not yet been reached. In other words, the system as disclosed tries to shift the ALR time to the moment when the current cycle pass is completed. Otherwise, if the initial ALR time plus the upper range limit has been reached without such a more favorable ALR time being identified, the ALR will be dated back to the original ALR time and carried out accordingly. After each ALR made, an internal ALR Time/Distance Interval Counter is reset and started again, so that the smart adjustment is properly tracked for subsequent ALR intervals.

In an alternate embodiment, an ALR time alignment functionality is also employed to strictly adjust the ALR time to the end of the roughing or finishing pass in case it immediately succeeds or precedes the latter, thus maintaining a rhythm of the cycle. The disclosed system shifts the ALR time to either the end of the current pass or to the end of the previous one, depending on which of the two is closer to the original ALR time. An ALR Time that would fall into a clean-up portion of the rough cut or into the step over to full cut depth is similarly avoided.

Continuing, when an ALR has to be made in the middle of planned motion, the shape of the tool insert and the adjacent portions of the workpiece dictate whether the cutting tool 305 can safely lift up or whether it needs to retract under a specific angle. For example, in rough cutting, the cutting tool 305 may be deeply engaged into the in-process workpiece 300 at the moment of lift-up, so an automatic procedure seeks to find a safe retract direction considering the cutting tool shape. The automatic procedure takes into account the positional relationship of the cutting edges on the cutting tool 305 and computes a retract direction based on that information.

To re-engage to the ALR point after the ALR action has been performed, a safe direction for engage is required. The reversed retract motion usually provides this desired direction and also the length for a safe re-engage. If it is not possible to retract and to re-engage the cutting tool 305 this way, a safe direction can be inferred from the surface normals. The cutting tool 305 may have to follow this direction at a lower cutting feedrate until it is a safe distance away from the material for the retract or fully re-engaged to its former position immediately before the ALR was made. In other words, the engage/retract for ALR is guided by the operation's engage/retract settings for the respective type of cut, but it will be adjusted by the system to local situations for collision avoidance reasons as long as there are no other restrictions that enforce a specific engage or retract type. The latter may be the case in finishing, for instance, where it can be necessary to suppress the automatic ALR engage and retract computations in order to assure surface quality.

A portion of the local return path connecting the retract, the local return point 320 and the re-engage, is always traveled under automatic control as it is currently done for the manual local return. Apart from that, the user has the freedom to specify the kind of transition to the local return point 320 with the same options as available for manual local return. The user is responsible for the correctness of his choice with respect to collisions on axial/radial transitions etc., although the system disclosed tries to aid in avoiding collisions whenever possible.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as replacing time with distance such that when referring to FIG. 2 and the accompanying description, "machining time" is replaced with "cutting distance." Likewise ALR by Distance is interchangeable with ALR by Time. Therefore, other implementations are within the scope of the following claims.

What is claimed is:

1. A method of monitoring a machine cycle, comprising the steps of:
    tracking an elapsed cumulative measure;
    comparing said elapsed cumulative measure with a cycle interrupt interval, the cycle interrupt interval having a first range limit and a second range limit;
    interrupting a machining cycle after the elapsed cumulative measure has exceeded the first range limit and at the earlier of
        when a machine operation is completed or
        when the elapsed cumulative measure reaches the second range limit; and
    performing a local return to a defined position upon said interrupting step.

2. The method of claim 1, wherein said elapsed cumulative measure is a machine time.

3. The method of claim 1, wherein said elapsed cumulative measure is cutting distance.

4. The method of claim 1, wherein said cycle interrupt interval is an automatic local return interval.

5. The method of claim 1, wherein said performing step occurs at an automatic local return time.

6. The method of claim 1, wherein said performing step occurs at an automatic local return distance.

7. The method of claim 1, wherein said defined position is one of a user defined position and an automatically defined position.

8. The method of claim 1, further comprising the step of updating and adjusting said cycle interrupt interval.

9. The method of claim 1, further comprising the step of updating said elapsed cumulative measure.

10. The method of claim 1, further comprising the step of analyzing a plurality of processor generated motions.

11. A computer-program product tangibly embodied in a machine readable medium to perform method of monitoring a machine cycle, comprising:
    instructions for tracking an elapsed cumulative measure;
    instructions for comparing said elapsed cumulative measure with a cycle interrupt interval, the cycle interrupt interval having a first range limit and a second range limit;
    instructions for interrupting a machining cycle after the elapsed cumulative measure has exceeded the first range limit and at the earlier of
        when a machine operation is completed or
        when the elapsed cumulative measure reaches the second range limit; and
    instructions for performing a local return to a defined position upon said interrupting step.

12. The computer-program product of claim 11, wherein said elapsed cumulative measure is a machine time.

13. The computer-program product of claim 11, wherein said elapsed cumulative measure is cutting distance.

14. The computer-program product of claim 11, wherein said cycle interrupt interval is an automatic local return interval.

15. The computer-program product of claim 11, wherein said performing instructions occur at an automatic local return time.

16. The computer-program product of claim 11, wherein said performing instructions occur at an automatic local return distance.

17. The computer-program product of claim 11, wherein said defined position is one of a user defined position and an automatically defined position.

18. The computer-program product of claim 11, further comprising the instructions of updating and adjusting said cycle interrupt interval.

19. The computer-program product of claim 11, further comprising the instructions of updating said elapsed cumulative measure.

20. The computer-program product of claim 11, further comprising the instructions of analyzing a plurality of processor generated motions.

21. A data processing system comprising a processor and accessible memory, and configured to implement a method of monitoring a machine cycle by performing the steps of:
    tracking an elapsed cumulative measure of operation of a machine;
    comparing said elapsed cumulative measure with a cycle interrupt interval, the cycle interrupt interval having a first range limit and a second range limit;
    interrupting a machining cycle after the elapsed cumulative measure has exceeded the first range limit and at the earlier of
        when a machine operation is completed or
    when the elapsed cumulative measure reaches the second range limit; and
    performing a local return to a defined position upon said interrupting step.

* * * * *